United States Patent [19]
Bobo, Jr.

[11] Patent Number: 5,177,129
[45] Date of Patent: Jan. 5, 1993

[54] INTERIOR CAN COATING COMPOSITIONS CONTAINING CYCLODEXTRINS

[75] Inventor: William S. Bobo, Jr., Louisville, Ky.

[73] Assignee: The Valspar Corporation, Minneapolis, Minn.

[21] Appl. No.: 688,842

[22] Filed: Apr. 22, 1991

[51] Int. Cl.⁵ .................................................. C08L 5/16
[52] U.S. Cl. ....................................... 524/48; 523/447; 523/448
[58] Field of Search ................... 524/48; 523/447, 448, 523/456

[56] References Cited

U.S. PATENT DOCUMENTS

| 4,289,674 | 9/1981 | Christenson et al. | 523/100 |
| 4,725,657 | 2/1988 | Shibanai | 424/486 |
| 5,063,251 | 11/1991 | Bergishagen | 521/84.1 |

FOREIGN PATENT DOCUMENTS 0252658 12/1985 Japan ..................................... 524/58

*Primary Examiner*—Paul R. Michl
*Assistant Examiner*—LaVonda R. DeWitt
*Attorney, Agent, or Firm*—Herbert P. Price

[57] ABSTRACT

The flavor protecting properties of interior container coating compositions are improved by the inclusion of cyclodextrins in the composition.

6 Claims, No Drawings

INTERIOR CAN COATING COMPOSITIONS CONTAINING CYCLODEXTRINS

BACKGROUND OF THE INVENTION

The field of art to which this invention pertains is metal container coating compositions.

In the manufacture of metal containers, a thin protective synthetic resin coating is applied to the interior of the container to prevent contact of the metal surface of the can with its contents. Such coatings ideally should have good adhesion to the interior metal surface, low extractables to prevent contamination of the container contents, and a rapid cure or drying rate for economy of container manufacture. Coating compositions which have been used for a number of years include organic solvent solutions and aqueous dispersions of synthetic thermoplastic and thermosetting resins which include such compositions as vinyl resins, polybutadiene resins, epoxy resins, aminoplast resins, phenoplast resins, and oleoresinous materials.

It is particularly important that containers which are used for foods and beverages contain no contaminants which not only can affect the preservation of the foods or beverage but also can affect the taste of the stored material. Taste quality is particularly important in the storage of beverages, especially beer, wherein very small amounts, in the order of parts per million or even parts per billion, of extranious material can have a detrimental effect on taste.

In an article published in "Inclusion Compounds," Volume 3, Chapter 11, pp. 331-390, Academic Press, London, 1984, J. Szejtli discusses cyclodextrins, their chemistry, and present and potential uses..

As discussed in Food Engineering, July 1987, pp. 36-38, cyclodextrins have the ability to capture or encapsulate other molecules within their ring structures. Because of this property, cyclodextrins offer a wide range of applications across the food industry for modifying taste, texture, color and aroma of processed foods and for shielding ingredients from the degrading effect of heat, light and oxygen. One use for cyclodextrins has been the debittering of citrus fruit juices.

In "Starch/Starke 27 (1975) pp 368-376, Szejtli and Banky-Eloa discuss inclusion complexes of unsaturated fatty acids and cyclodextrins.

The stabilization of autoxidizable fatty acids with cyclodextrins is described in U.S. Pat. No. 2,827,452.

In U.S. Pat. Nos. 4,722,815 and 4,725,657, synthetic resin compositions are disclosed which are made from a synthetic resin, cyclodextrin, glycitol, and a molecular inclusion compound included in the cyclodextrin. Molecular inclusion compounds are listed as being perfumes, insecticides, mold or mildew proofing agents, anti-fungi agents and bactericides.

There is a continuing need for interior container coating compositions which prevent contaminants from mixing with the container contents and affecting the quality of said contents.

SUMMARY OF THE INVENTION

This invention is directed to coating compositions for use on the interior surfaces of containers wherein said coatings protect foods or beverages stored in the containers from contaminants which adversely affect taste.

The interior container coating composition of this invention is made from a solution or dispersion of a synthetic thermoplastic or thermosetting film forming resin having blended therein about 0.5 to about 5 weight percent of a cyclodextrin wherein said weight percents are based on the total coating composition weight.

The coating composition of this invention is particularly useful for coating the interior of beer containers to prevent the development of an "off-taste" similar to stale beer, which off-taste is believed to be caused by trace amounts of certain aldehydes and ketones, e.g., aldehydes and ketones which contain about 6 to about 18 carbon atoms.

DETAILED DESCRIPTION OF THE INVENTION

Cyclodextrins are cyclic carbohydrate molecules composed of several glucose monomers bound together in a doughnut-shaped truncated cone. This configuration creates hydrophilic rims at top and bottom and a hydrophobic cavity in the middle, resulting in a structure capable of binding and encapsulating molecules of the proper size within the cavity. This phenomenon is known as "molecular inclusion."

Cyclodextrins have been made enzymatically from corn starch using a glucose transverse enzyme. Three cyclodextrins which have been produced in commercial quantities are the alpha, beta, and gamma forms. Alpha-cyclodextrin contains 6 glucose units and has a molecular weight of 973. Its cavity diameter is 5-6 angstroms and it cavity depth is 7-8 angstroms. Beta-cyclodextrin contains 7 glucose units and has a molecular weight of 1135. Its cavity diameter and its cavity depth are 7-8 angstroms. Gamma-cyclodextrin contains 8 glucose units and has a molecular weight of 1297. Its cavity diameter is 9-10 angstroms and its cavity depth is 7-8 angstroms. The solubility in grams per 100 mls of water at 25° C. for alpha-cyclodextrin is 14.5, for beta-cyclodextrin - 1.85, and for gamma-cyclodextrin-23.2.

The coating compositions useful in this invention are all of the interior container coating compositions which are well known to those skilled in the art. The polymer systems used to make the interior container coating compositions include oleoresinous compositions based on drying oils, alkyd resins, phenolic resins, polyamides, polyurethanes, epoxy resins, silicones, butadiene polymers, acrylic or methacrylic ester polymers, vinyl chloride polymers, vinyl acetal or vinyl butyral polymers, and fluorocarbon polymers. Combinations of useful polymer systems include acrylic and amino resins, acrylic and epoxy resins, alkyd and aminoresins, alkyd and acrylic resins, polyester and epoxy resins, polyester and aminoresins, phenolic and epoxy resins, epoxy and aminoresins, and phenolic and aminoresins.

The coating compositions can be used as organic solvent solutions of the polymer systems, as non-aqueous dispersion of the polymers, as aqueous emulsions or latices, and as aqueous dispersions of the resins.

The polymer systems can be thermoplastic, e.g., the vinyl chloride polymers, or thermosetting, e.g., the epoxy-aminoresin compositions.

Coating compositions useful in this invention are well known in the art and are described in detail in the literature and the patent art. Examples of such compositions include organic solvent solutions of polyglycidyl ethers of polyhydric phenols which are cured with urea-formaldehyde, melamine-formaldehyde, and phenol-formaldehyde resins.

Particularly preferred coating compositions for use in this invention are the aqueous dispersions of polyhydroxy polyether resins and acrylic resins, cured with aminoplast and phenolplast resins. Such compositions are described in detail in U.S. Pat. Nos. 4,442,246; 4,212,781; and 4,751,256, which are hereby incorporated by reference.

In preparing the coating compositions of this invention, the cyclodextrin, in the amount of about 0.5 to about 5 weight percent and preferably about 1 to about 3 weight percent, based on the weight of the coating composition, is added to and blended into the coating compositions. The composition is then applied to the interior surface of a container which is then heated to dry and/or cure the coating. Extraction studies conducted on the coatings of this invention when compared to such studies conducted on identical coatings which do not contain cyclodextrins show a dramatic decrease or absence of aldehydes and ketones which are considered to be the source of flavor problems in beer.

The following examples describe the invention in detail. Parts and percentages unless otherwise designated are parts and percentages by weight.

EXAMPLE 1

An aqueous film-forming resin dispersion was made to which was added 1 percent beta-cyclodextrin based on the total dispersion weight. The dispersion contained the following components:

| Components | Parts |
|---|---|
| Epoxy Resin* | 13.27 |
| Acrylic Copolymer** | 4.38 |
| Hexamethoxymethyl Melamine | 0.92 |
| Dodecylbenzene Sulfonic Acid | 0.75 |
| Carnauba Wax | 0.05 |
| Dimethylethanol Amine | 0.54 |
| Triethanol Amine | 0.55 |
| N-Butyl Alcohol | 8.38 |
| 2-Butoxyethanol | 5.58 |
| N-Hexyl Alcohol | 0.64 |
| Deionized Water | 64.72 |
| Beta-Cyclodextrin | 0.99 |

*Polyglycidyl ether of Bisphenol A - epoxide equivalent weight - 2246.
**Copolymer of 35.6 percent acrylic acid, 32.2 percent ethyl acrylate and 32.2 percent methyl acrylate.

The Acrylic Copolymer and the Hexamethoxymethyl Melamine were incorporated in the dispersion composition using the procedure described in U.S. Pat. No. 4,289,811, which is hereby incorporated by reference.

The interior surfaces of glass beakers were coated with the aqueous dispersion. One set of beakers was baked for 1 minute at 360° F. (Ex. 1A), and another set was baked at 380° F. (Ex. 1B).

The interior surfaces of another set of glass beakers were coated with the aqueous dispersion which contained no beta-cyclodextrin. The beakers baked at 360° F. were labelled Ex. 1C, the ones at 380° F. were labelled Ex. 1D.

Each set in the examples contained 12 beakers.

Extraction studies were conducted on the coated beakers as follows:

One beaker in each set was filled with methylene chloride. After 5 minutes at room temperature, the methylene chloride was transferred to another beaker in the set. After 5 minutes, the methylene chloride was again transferred to the next beaker. The transfers were continued using all twelve beakers in the set, thusly concentrating any extracted material. The methylene chloride was then analyzed for aldehydes and ketones using high performance chromatographic analysis. The results are listed in the Table.

TABLE

| Example | 2-heptenal ppb | 2-heptanone ppb | 2-octenal ppb | octanal ppb | 2-nonenal ppb |
|---|---|---|---|---|---|
| 1A | 0.2 | — | 0.4 | — | — |
| 1B | — | — | — | — | — |
| 1C | 0.2 | 0.95 | 0.65 | — | 0.3 |
| 1D | — | 0.45 | 0.3 | 0.3 | 0.3 |

| Example | 2,4-decadienal | n-nonanal | 2-decenal | n-decanal |
|---|---|---|---|---|
| 1A | — | 0.8 | — | 0.3 |
| 1B | — | — | — | — |
| 1C | 1.2 | — | 0.8 | 0.47 |
| 1D | 0.35 | 0.2 | — | 0.3 |

EXAMPLE 2

Similar results were obtained using a coating composition which contained 2 weight percent beta-cyclodextrin.

Taste tests conducted on beer which had been stored in cans coated with the coatings of Example 1 and Example 2 were satisfactory.

The principles, preferred embodiments and modes of operation of the present invention have been described in the foregoing specification. The invention which is intended to protected herein, however, is not to be construed as limited to the particular forms disclosed, since these are to be regarded as illustrative rather than restrictive. Variations and changes may be made by those skilled in the art without departing from the spirit of the invention.

What is claimed is:

1. An interior container coating composition comprising a solution, emulsion, or dispersion of a synthetic thermoplastic or thermosetting film forming resin having blended therein about 0.5 to about 5 weight percent, based on the weight of the coating composition, of a compound consisting of a cyclodextrin of the alpha, beta, or gamma form.

2. The composition of claim 1 wherein the cyclodextrin is beta-cyclodextrin.

3. The composition of claim 2 which contains about 1 to about 3 weight percent beta-cyclodextrin.

4. The composition of claim 1 wherein the composition is an aqueous dispersion of a synthetic film forming resin.

5. The composition of claim 4 wherein the synthetic film forming resin is a thermosetting resin.

6. The composition of claim 5 wherein the thermosetting resin is an epoxy resin and an aminoresin.

* * * * *